S. LOVE.
Potato-Digger.
No. 208,747. Patented Oct. 8, 1878.
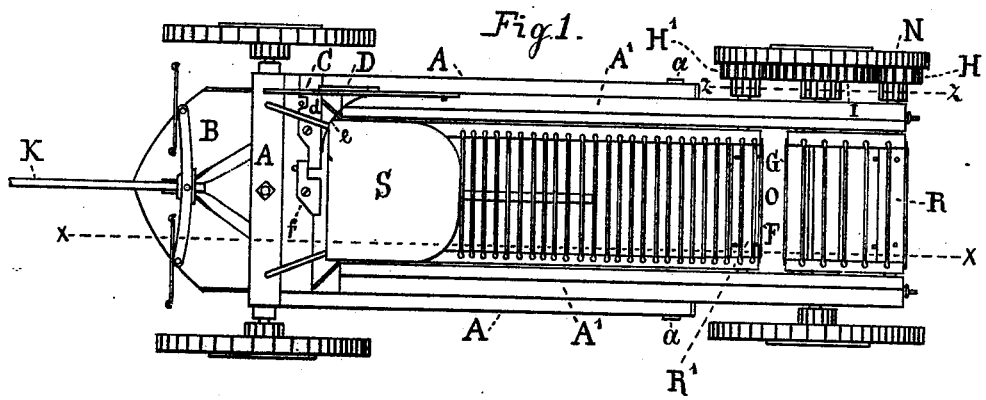
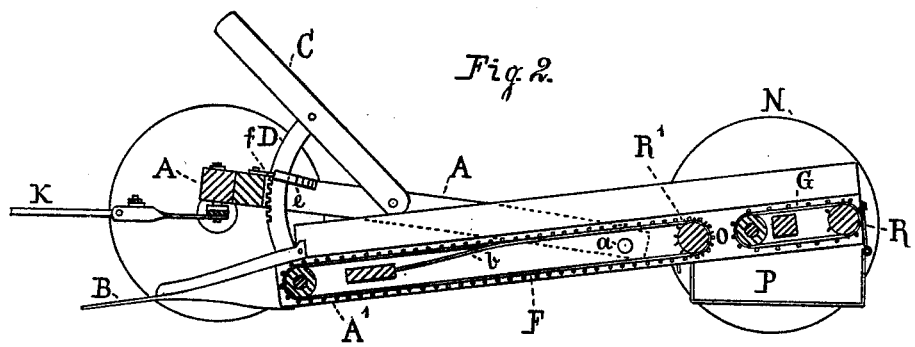
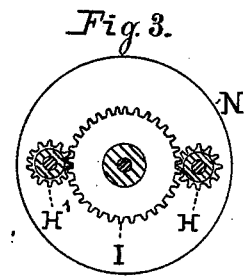
WITNESSES:
James B. Ligius
R. P. Daggett
INVENTOR:
Samuel Love.

UNITED STATES PATENT OFFICE.

SAMUEL LOVE, OF INDIANAPOLIS, INDIANA.

IMPROVEMENT IN POTATO-DIGGERS.

Specification forming part of Letters Patent No. 208,747, dated October 8, 1878; application filed January 8, 1878.

*To all whom it may concern:*

Be it known that I, SAMUEL LOVE, of Indianapolis, in the county of Marion and State of Indiana, have invented certain Improvements in a Potato-Digger, of which the following is a specification:

The first part of my invention relates to the combination of a plow with screen-aprons worked by cog-wheels on rear wheel, as per drawings, so that when the team moves forward and the plow passes under the hill, the front apron receives the potatoes, stalks, and earth from the plow, sifts the earth from the potatoes and stalks, deposits the potatoes in the box under the rear apron through the open space between the aprons, and passes the stalks over the rear apron to the ground.

The second part of my invention relates to the raising and lowering of the plow, at the pleasure of the driver, by a lever and circular bar, and securing it in the position desired by a spring catch or lock engaging with notches in a circular bar worked by the foot of the driver, as per drawings.

In the accompanying drawings, Figure 1 is a top view of the machine embodying my invention. Fig. 2 is a vertical longitudinal section, showing those parts of the machine which are at the right hand of the line $x\,x$, drawn across Fig. 1. Fig. 3 is a vertical section through line $z\,z$ of Fig. 1, showing motive power of machinery.

A is the part of frame-work by which the entire machine is drawn, resting on front axle, to be substantially constructed to carry the weight of plow, aprons, and driver. A' is the part of frame-work resting on rear axle, supporting aprons F and G and box P to receive potatoes.

Frame-work A and A' are connected by pivots $a$, to raise or lower frame-work A' by lever C, and secured in the desired position by circular bar D, which is secured to lever C and frame A'. The circular bar D is secured at any desired position by lock $d$, which is worked by treadle $f$. The lock $d$ is kept in position, when not worked by treadle, by spring $e$.

As the machine moves forward, drawn by horses hitched to tongue K, the plow B, when lowered into ground by driver on seat S, receives the earth, potatoes, stalks, &c., the speed of the team causing them to pass onto apron F, which is worked by roller R', and is supported by spring $b$. The earth sifts through the apron. The potatoes, stalks, &c., are carried up to opening O between aprons F and G. The potatoes drop into box P. The stalks, &c., pass onto apron G, which is worked by roller R, and the stalks, &c., pass over apron G, and are dropped to the ground. To driving-wheel N is secured cog-wheel I, which works cog-wheels H' and H. Cog-wheel H' works roller R', which works apron F. Cog-wheel H works roller R, which works apron G.

I claim as my invention—

The combination of the plow B, apron F, and spring $b$, together with roller R', cog-wheel H', and box P, substantially as and for the purpose hereinbefore set forth.

SAMUEL LOVE.

Witnesses:
 JAMES B. LIZIUS,
 R. P. DAGGETT.